(12) United States Patent
Walthert et al.

(10) Patent No.: US 10,549,578 B2
(45) Date of Patent: Feb. 4, 2020

(54) HUB, IN PARTICULAR FOR BICYCLES

(71) Applicant: DT SWISS INC., Grand Junction, CO (US)

(72) Inventors: Martin Walthert, Aarberg (CH); Stefan Spahr, Lengnau (CH)

(73) Assignee: DT SWISS INC., Grand Junction, CO (US)

( * ) Notice: Subject to any disclaimer, the term of this patent is extended or adjusted under 35 U.S.C. 154(b) by 194 days.

(21) Appl. No.: 15/659,850

(22) Filed: Jul. 26, 2017

(65) Prior Publication Data
US 2018/0029413 A1 Feb. 1, 2018

(30) Foreign Application Priority Data
Jul. 26, 2016 (DE) .................. 10 2016 113 733

(51) Int. Cl.
*B60B 27/04* (2006.01)
*B60B 27/00* (2006.01)
*B60B 27/02* (2006.01)

(52) U.S. Cl.
CPC .......... *B60B 27/047* (2013.01); *B60B 27/001* (2013.01); *B60B 27/0073* (2013.01); *B60B 27/023* (2013.01)

(58) Field of Classification Search
CPC . B60B 27/001; B60B 27/0073; B60B 27/023; B60B 27/047; F16D 41/24; F16D 41/26; F16D 41/36
See application file for complete search history.

(56) References Cited

U.S. PATENT DOCUMENTS 5,460,254 A   10/1995   Huang
5,676,227 A   10/1997   Huegi
(Continued)

FOREIGN PATENT DOCUMENTS

DE   19856626 A1   6/2000
GB     572237 A    9/1945
(Continued)

OTHER PUBLICATIONS

German Search Report from German Patent Application No. 10 2016 113 733.2, dated Apr. 18, 2017.
(Continued)

*Primary Examiner* — Kip T Kotter
(74) *Attorney, Agent, or Firm* — Greer, Burns & Crain, Ltd.

(57) ABSTRACT

A hub for bicycles with a hub shell rotatably supported relative to a hub axle by roller bearings and a rotor rotatably supported relative to the hub axle by at least two rotor bearings and with a freewheel device with two interacting freewheel components namely, a hub-side freewheel component and a rotor-side freewheel component. The two freewheel components are movable relative to one another in the axial direction between a freewheel position and an intermeshing engaging position in which a driving torque can be transmitted. The hub-side freewheel component is compact in configuration and a hub bearing to rotatably support the hub shell is integrated and configured therein. An outer ring of the hub bearing is configured in an axial body section of the hub-side freewheel component. A sealing unit protects the interior of the hub bearing from the entry of dirt and water.

27 Claims, 4 Drawing Sheets

(56) References Cited

U.S. PATENT DOCUMENTS

| | | | |
|---|---|---|---|
| 5,718,315 A | 2/1998 | Chen | |
| 5,950,784 A | 9/1999 | Yang | |
| 7,641,904 B2* | 1/2010 | Kim | C07K 16/244 |
| | | | 424/141.1 |
| 8,757,341 B2* | 6/2014 | Klieber | B60B 27/047 |
| | | | 192/110 B |
| 8,936,144 B2 | 1/2015 | Spahr et al. | |
| 9,010,875 B2* | 4/2015 | Spahr | B60B 27/047 |
| | | | 301/110.5 |
| 9,212,708 B2 | 12/2015 | Spahr et al. | |
| 10,065,452 B2 | 9/2018 | Walthert et al. | |
| 2005/0184580 A1 | 8/2005 | Kuan et al. | |
| 2006/0043786 A1* | 3/2006 | Lin | B60B 27/023 |
| | | | 301/110.5 |
| 2008/0006500 A1* | 1/2008 | Spahr | B60B 27/0073 |
| | | | 192/64 |
| 2009/0277741 A1 | 11/2009 | Chen | |
| 2010/0170762 A1* | 7/2010 | Schlanger | F16D 41/36 |
| | | | 192/46 |
| 2012/0048671 A1* | 3/2012 | Kozak | B60B 27/047 |
| | | | 192/64 |
| 2012/0275785 A1* | 11/2012 | Dasamaneni | H04J 3/085 |
| | | | 398/45 |
| 2013/0088075 A1* | 4/2013 | Spahr | B60B 27/023 |
| | | | 301/110.5 |
| 2013/0105266 A1 | 5/2013 | Spahr et al. | |
| 2018/0029412 A1 | 2/2018 | Walthert et al. | |
| 2018/0029413 A1 | 2/2018 | Walthert et al. | |
| 2018/0050564 A1 | 2/2018 | Walthert et al. | |
| 2019/0030951 A1 | 1/2019 | Walthert et al. | |
| 2019/0032730 A1 | 1/2019 | Walthert et al. | |

FOREIGN PATENT DOCUMENTS

| | | |
|---|---|---|
| GB | 668943 A | 3/1952 |
| JP | 59-175637 A | 10/1984 |

OTHER PUBLICATIONS

European Search Report from European Patent Application No. 17183409.6, dated Dec. 6, 2017.

* cited by examiner

HUB, IN PARTICULAR FOR BICYCLES

BACKGROUND

The present invention relates to a hub for at least partially muscle-powered vehicles and in particular bicycles, the hub comprising a hub shell which is rotatably supported relative to a hub axle by way of two roller bearings disposed on opposite end regions of the hub shell. The hub comprises a rotor for non-rotatable arrangement of at least one sprocket, the rotor being rotatably supported relative to the hub axle by means of at least two rotor bearings. A freewheel device is provided between the rotor and the hub shell.

Other than in bicycles, the invention may also be used in other partially muscle-powered vehicles which are for example provided with an electric auxiliary drive. The hub is in particular used in sports bicycles and the like.

The prior art has disclosed various hubs comprising a freewheel so that the pedal crank will not keep rotating along for example during a downhill ride. This freewheel also allows contrarotating of the hub shell and the rotor in backpedaling.

The prior art has disclosed hubs with ratchet freewheels where the pawls can radially pivot between a freewheel position and an engaging position. These hubs are provided with different numbers of ratchet pawls and tend to show four ratchet pawls symmetrically distributed over the circumference. As force is transmitted, the ratchet pawls engage a toothing in the rotor. The relatively low number of ratchet pawls results in a relatively large angle of rotation until rotational force is transmitted when pedaling is resumed.

GB 668,943 has disclosed a freewheel hub for bicycles showing screwed into the hub shell a shell-shaped part whose inside surface forms the raceway for the ball of the ball bearing, while a radially outwardly extending wall has an axial toothing formed thereat which together with an axial toothing forms an axial freewheel at the rotor. Due to the larger number of teeth of the axial toothing, re-engagement is faster as pedaling is resumed. The drawback of this system is that the rotor shifts in the axial direction when the hub is transferred to the freewheeling state and the engaged state. With the systems used today this might cause a gear shift. Moreover, dirt and moisture might enter the freewheel, impeding or even entirely disabling the function which is dangerous to the rider.

DE 10 2010 033 268 A1 discloses a hub in which two end-toothed components form an axial freewheel. Pairs of adjacent hub bearings at the hub shell ends serve as supports relative to the hub axle. The drawback is the high space requirement for the adjacent hub bearings. Moreover, the hub axle is not provided with any radial shoulders so that it cannot serve for axially supporting the hub components. Therefore, to axially support the hub the axial force is transmitted from a roller bearing into the hub shell on one side and on the other side it is abducted through a roller bearing via sleeve elements disposed on the hub axle. In another embodiment shown in a simplistic illustration, one or two hub bearings are accommodated on the inside of the end-toothed component and in yet another embodiment shown in a simplistic illustration an end toothing of the axial freewheel is integrally formed at the outer bearing race of the hub bearing so as to enable saving axial mounting space if only one hub bearing is used. Protection from dust and water is left to seals at the hub shell. The outer bearing race is provided on its radially outside surface with a non-round contour which is pushed into a corresponding, non-round contour of the hub shell and is thus non-rotatably coupled with the hub shell. An axial fixation of the hub bearing is not mentioned. This allows the hub bearing to axially shift in the freewheeling state so that the hub may assume undefined states. For these reasons, the function may be impeded.

DE 94 19 357 U1 has disclosed a hub with a toothed disk freewheel which reliably and very quickly transmits the driving force from the rotor to the hub shell while otherwise, friction losses are relatively low while the user does not activate the pedals. A toothed disk freewheel has many advantages and allows particular fast response of the freewheel. In this freewheel, a pair of toothed disks transmits forward rotational force of the rotor while in backpedaling, the teeth disengage axially. The known hub per se functions satisfactorily and is used in the area of sports and also in professional riding. The ball bearings are placed in defined positions in the axial direction by spacer bushes. However, there is the disadvantage that the high loads acting on the hub for example in uphill rides may generate bending moments in the hub so as to cause the toothed disk to slightly tilt which results in higher wear on the teeth which are subjected to higher forces so that durability is limited and the toothed disks require early replacement to avoid malfunction.

Also, hubs with toothed disk freewheels have been disclosed which are provided with a freewheel having an axial toothing, wherein an axial toothing is fixedly integrated in the rotor and a toothed disk is non-rotatably and axially displaceably accommodated in the hub shell by means of one or more springs and is axially biased in the direction toward the toothing in the rotor. A hub showing reversed function has also been disclosed which includes a toothed disk freewheel and has a toothed disk fixedly integrated in the hub shell and where the other of the toothed disks is biased by means of a spring in the direction of the hub shell. Then again, both these hub types providing for axial movability of only one of the toothed disks have the disadvantage due to the high loads in sports or professional cycling that some of the teeth may be subjected to higher loads and faster wear so that early replacement is advisable of the toothed disks, the rotor or even the hub shell to avoid malfunction.

A feasible alternative would be a stiffer configuration overall of a hub with a toothed disk freewheel by employing stiffer and thus heavier materials or by employing greater wall thicknesses which would increase the weight though. However, since in sports and professional cycling each and every gram of weight counts, this does not provide the desired solution.

EP 1 121 255 B1 has disclosed a lightweight hub having a toothed disk freewheel and showing reliable function wherein the teeth of the toothed disks are stressed more evenly. This hub uses a pair of toothed disks, both of which are axially movable and are axially urged toward one another from the outside by means of a spring. The two toothed disks are thus floatingly supported, and for example in case of the hub flexing or given other types of stresses, they may show better positioning to one another so as to provide more even wear on the toothed disks and a particularly reliable operation. However, an even stiffer hub is desirable.

Against the background of the prior art it is therefore the object of the present invention to provide a hub which provides reliability of function and is lightweight or optionally more lightweight and which is perhaps even stiffer in configuration.

SUMMARY

A hub according to the invention is provided for at least partially muscle-powered vehicles, and in particular two-wheeled vehicles, and preferably bicycles and comprises a hub shell rotatably supported (in particular by means of roller bearings) relative to and in particular on a hub axle and a rotor rotatably supported relative to and in particular on the hub axle by means of at least two rotor bearings, and particularly preferably disposed fixed or axially stationary in the axial direction in operation which is suitable for non-rotatable arrangement of at least one sprocket or a sprocket cluster. Furthermore, a freewheel device having two interacting freewheel components is comprised which freewheel device comprises a hub-side freewheel component and a rotor-side freewheel component. The two freewheel components are movable relative to one another in the axial direction at least between a freewheel position and an intermeshing engaging position, wherein a driving torque can be transmitted in the freewheel position. The hub-side freewheel component is compact in configuration and a hub bearing to rotatably support the hub shell is integrated and configured therein. An outer ring of the hub bearing is configured in an axial body section of the hub-side freewheel component. At least one sealing unit protects the interior of the hub bearing from the entry of foreign bodies, and in particular contaminants such as dirt and dust and water.

The hub according to the invention has many advantages. The hub according to the invention in particular allows a stiffer architecture since the lateral axial distance of the roller bearings from the bearing of the hub shell may be selected considerably larger than has been the case in the prior art with toothed disk freewheels. The fact that the hub-side freewheel component has a roller bearing for rotatable support of the hub shell allows a marked reduction of the axial width of the roller bearing required overall and the freewheel component, so that the hub shell is supported on a clearly broader basis overall to thus considerably improve the lateral stiffness of a wheel equipped therewith. The hub is also very reliable since the hub bearing is provided with at least one sealing unit. The hub shell is not only provided with a seal, e.g. between the rotor and the hub shell, but also with a separate sealing unit immediately on the hub bearing so as to enable a high availability level and a long service life.

Preferably, a sealing unit is disposed between the inner ring and the outer ring of the freewheel bearing. Particularly preferably, a sealing unit is disposed between the inner ring and an annular flange connected with the axial body section to protect the interior of the freewheel bearing from the entry of foreign bodies. At least one sealing unit at each axial end is preferred.

The hub-side freewheel component is in particular a separate part and is not integrally formed with the hub shell, since a hub shell tends to consist of one or more components of a more lightweight material or of several lightweight materials such as light metal or fibrous composite material, while the freewheel component is manufactured from a stronger and thus often heavier material. For example, steel is a suitable material for the freewheel component.

The hub shell is in particular rotatably supported relative to the hub axle by means of two (or more) hub bearings in the shape of roller bearings. The two hub bearings are preferably disposed in opposite end regions of the hub shell. The hub bearings for supporting the hub shell relative to the hub axle may be referred to as hub shell bearings. One of the hub bearings is incorporated in the freewheel component. It is also possible to employ two adjacent hub bearings at least on one side, or in at least one end region of the hub shell to rotatably support the hub shell on the hub axle. Alternately, pairs of hub bearings may be provided at each of the hub shell ends. Then, two (directly or indirectly) adjacent hub bearings are configured on the hub-side freewheel component wherein the axial body section provides raceways for grouped pairs of rolling members. Particularly preferably, one roller bearing only is configured and incorporated in the hub-side freewheel component.

The fact that one of the hub bearings is formed to rotatably support the hub shell on the hub-side freewheel component allows a lateral increase by several millimeters of the lateral distance of the hub bearings to support the hub shell. This already achieves a considerably increased rigidity of the hub. Any bending moment acting during pedaling is considerably decreased. The lateral axial distance between the surface of force application for transmitting the driving torque and the bearing position is considerably shorter than in the prior art, since the hub bearing is formed directly inwardly of the hub-side freewheel component, and it may thus also be referred to as a freewheel bearing. The distance may even be halved over the prior art. Moreover, the lateral axial distance of the hub bearings to support the hub shell may be noticeably increased.

Another advantage is that the distance between the two rotor bearings may also be enlarged so as to achieve increased rigidity there. It is also very advantageous that the hub is simpler in its architecture. The rotor bearings are also preferably configured as roller bearings.

At the same time, the invention allows a clearly more lightweight hub architecture overall. A weight advantage is achieved by way of a configuration of the hub-side freewheel component that is more lightweight due to the structure. Another weight advantage is achieved by way of configuring the hub sleeve with thinner walls. The known prior art provides for the hub shell to surround the roller bearing and the toothed disk accommodated adjacent thereto in the hub shell. However, a minimum wall thickness of the hub shell must be observed to ensure the required stability. In the known prior art this results in a hub shell showing a considerably larger wall thickness over a clearly larger axial region compared to the present invention. Thus the invention achieves higher rigidity combined with a lower weight. In addition, the parts required are fewer in number so as to simplify the architecture and assembly and maintenance.

Axial mounting space is saved by way of the invention. Both the hub shell and also the rotor may be provided with broader axial supports than was the case with the prior art known from EP 1 121 255 B1.

In the invention, a hub bearing is formed on the hub-side freewheel component to rotatably support the hub shell to stiffen the hub and to enable increasing an axial distance of the hub bearings of the hub shell.

In all the configurations, the freewheel components transmit in the engaging position a rotational movement in the driving direction from the rotor to the hub body. In the freewheel position, a rotation of the freewheel components relative to one another is possible and thus also of the hub body relative to the rotor.

In a preferred specific embodiment, the two freewheel components are biased in the engaging position by means of at least one biasing device. The freewheel components preferably each comprise engagement elements configured on the front face which mesh with one another in the engaging position. Thereby, in the engaging position, the freewheel components transmit a rotational movement in the driving direction from the rotor to the hub shell. In the freewheel position, a rotation of the freewheel components relative to one another is possible and thus also of the hub shell relative to the rotor opposite the direction of drive rotation.

In all the configurations, it is preferred for each of the freewheel components to comprise an axial toothing. The freewheel device is in particular configured as a toothed disk freewheel. Then, the engagement elements are preferably provided by axial teeth, which are in particular biased to the engaging position by means of at least one spring or a plurality of springs or spring elements. The number of engagement elements on each freewheel component is in particular between 16 and 80 and in particular between 18 and 72. This allows very quick responses.

Preferably, the axial body section is connected with an annular flange with a front-faced axial toothing which interacts with an axial toothing on the rotor-side freewheel component. The axial toothings preferably comprise engagement elements (axially outwardly).

In preferred configurations, the roller bearing configured on the hub-side freewheel component comprises an outer ring and an inner ring and rolling members disposed between the outer ring and the inner ring. Then, the outer ring forms the outer raceway for the rolling members and it is formed on the axial body section of the hub-side freewheel component. This means that the outer ring is not a separate component inserted into the hub-side freewheel component, but it is directly formed integrally or it is even formed of one single, integral material, in the hub-side freewheel component. The outer ring is fixedly and inseparably connected with the axial body section of the hub-side freewheel component. The raceways for the rolling members may be hardened.

Preferably, the hub bearing formed in the hub-side freewheel component comprises rolling members disposed in rolling member cages.

In all the configurations, it is preferred for at least one of the roller bearings to be formed as a ball bearing and to comprise a guide for the rolling members in the outer ring. Preferably, a guide and in particular a guide groove for the rolling members is formed directly in the freewheel component in the hub bearing configured in the hub-side freewheel component.

In all the configurations, it is preferred for the rotor-side freewheel component to be non-rotatably and axially movably accommodated on the rotor and the hub-side freewheel component to be non-rotatably and in particular also axially fixedly coupled with the hub shell. The rotor-side freewheel component may in particular be configured as, or comprise, a toothed disk. The rotor-side freewheel component is preferably provided with a front face axial toothing.

In preferred configurations, the axial body section has a round outer cross-section and its configuration is in particular tubular. Then, in particular, the round outer cross-section is provided with an external thread with which the axial body section is screwed into an internal thread of the hub shell when assembled.

Alternately, it is possible and preferred for the axial body section to be non-round in its outer cross-section. The axial body section may for example show a polygonal outer cross-section. Then, the (non-round) outer cross-section of the axial body section is in particular adapted to a matching non-round inner cross-section of the hub shell. Alternately, tooth-like structures (external and internal toothing) are possible, wherein the axial body section is preferably axially fixed on the hub shell. The axial position may follow from the axially defined positioning of the inner ring of the hub shell bearing on or in the hub-side freewheel component.

Alternately, it is possible for the axial body section to be round or non-round in its outer cross-section and to not be non-rotatably coupled with the hub shell by way of an external circumferential form grip. Alternately, for example, coupling pins or coupling screws may be provided to connect the hub-side freewheel component, non-rotatably and optionally also axially fixedly, with the hub shell.

In simple configurations, the axial body section is equipped with an external thread and is screwed into an internal thread of the hub shell when assembled. Thereby the hub-side freewheel component is axially fixedly and non-rotatably connected with the hub shell. The axial body section may also be referred to as a tubular body section and in these specific embodiments, it is preferably configured substantially cylindrically. In the interior, the axial body section preferably serves as an outer ring of the roller bearing configured in the hub-side freewheel component.

In radial section the hub-side freewheel component is preferably substantially L-shaped in cross-section, wherein one of the legs of the "L" forms the (circumferential) axial and presently tubular body section and the other of the legs of the "L" extends in the radial direction and is equipped with the engagement elements.

Preferably, the roller bearing formed in the hub-side freewheel component is formed entirely inwardly of the hub-side freewheel component or is radially entirely surrounded thereby.

In preferred configurations and specific embodiments, the hub-side freewheel component has a radially outwardly protruding appendix which protrudes radially outwardly in particular beyond the axial body section, and which when mounted preferably rests against a radial shoulder of the hub shell. This achieves an axially defined position of the hub-side freewheel component and thus of the hub-side formed therein. The outwardly protruding appendix may be configured as a singular appendix, or else several appendices are provided (symmetrically) distributed over the circumference. Alternately, the appendix may be configured as a circumferential flange which extends radially outwardly in particular from the axially outwardly end of the axial body section.

The annular flange in particular extends radially inwardly on the axially outwardly end of the axial body section. Then, the annular flange forms the radial leg of the L as it has been described above. The annular flange in particular comprises an axial toothing on the front face.

Preferably, the roller bearing formed on the hub-side freewheel component comprises at least one sealing unit between the inner ring and the outer ring. Particularly preferably, the roller bearing formed on the hub-side freewheel component comprises an annular seal ring between the annular flange and the inner ring as a sealing unit.

It is also possible for the sealing unit to comprise at least one (non-contact) radial flange or a double flange.

Preferably, a sealing unit is disposed between an inner ring of the hub bearing and the annular flange. A gap is preferably configured between the inner ring of the hub bearing on the hub-side freewheel component and the annular flange (on the axially outwardly side), which gap is narrower than a distance between the inner ring and the outer ring on the axially inwardly side (relative to the hub) of the hub bearing configured on the hub-side freewheel component. A ratio of the gap to the distance is in particular less than 1:2 and preferably less than 1:4 and particularly preferably less than 1:5. The gap is in particular narrower than 2 mm and preferably narrower than 1 mm. The gap is in particular narrower than ⅓ and preferably than ¼ and particularly preferably than ⅕ of the rolling member diameter. The gap may be narrower than ⅙ or ⅐ of the rolling member diameter. The gap is preferably less than ⅙ and in particular ⅛ or ⅒ of the axial width of the inner ring.

Preferably, the sealing unit comprises at least one seal ring disposed in a sealing groove between the annular flange and the inner ring. The or one sealing groove may be configured in the annular flange. The or another sealing groove may also be configured in the inner ring.

The annular flange, and in particular the radially inwardly end of the annular flange is in particular provided with a circumferential groove as the sealing groove in which a sealing unit, and in particular a seal ring is disposed. The seal ring seals the hub bearing axially outwardly in the axial direction, and it is accommodated in the sealing groove and shows an outer diameter that is adapted to the depth of the sealing groove and the size of the gap. Preferably, the seal ring rests contacting against the sealing groove and the inner ring. Another sealing unit is preferably disposed on the axially inwardly side for sealing the distance, which is larger here, between the inner ring and the outer ring respectively the axial body section. This sealing unit is in particular configured as an elastomeric seal and is a contacting seal.

Preferably, a ratio of the maximum axial width of the hub-side freewheel component with an integrated hub bearing to a radial extension of the hub-side freewheel component from the inner ring up to the radially extreme point (of the hub-side freewheel component) lies between 0.8 and 1.5. In particular, this ratio lies between 1 and 1.4, and in concrete configurations it may be between 1.1 and 1.2 or 1.3 and e.g. 1.15+/−0.02.

In advantageous configurations, the ratio of an axial width of the hub-side freewheel component to an axial width of the inner ring of the hub bearing integrated in the hub-side freewheel component lies between 1 and 1.5. In preferred configurations, this ratio is between 1.1 and 1.3-, and it may specifically be approximately 1.22+/−5%.

Preferably, the ratio of the axial width of the hub-side freewheel component to the diameter of a rolling member of the hub bearing integrated in the hub-side freewheel component is between 2:1 and 3:1, and it may in particular be between 2.25 and 2.75 and it may specifically be approximately 2.45+/−0.05.

It is preferred for the ratio of a radial dimension of the hub-side freewheel component from the inner ring up to the outer surface of the axial body section to the diameter of a rolling member to be between 2.5 and 1.5. In preferred configurations, the ratio is between 1.75 and 2.25 and it may specifically be 1.85+/−0.05.

All of these parameters indicated above define a compact hub and a hub-side freewheel component requiring little space. The hub-side freewheel component with the hub bearing integrated therein is highly compact in structure and allows a particularly low weight of the entire hub. The operational reliability and service life increase as well. This functionality may be defined by way of the indicated relationships, values, and ranges of values.

Preferably, a radial shoulder is formed in the hub shell showing a narrow axial distance from the axially inwardly end of the axial body section of the hub-side freewheel component. This is to ensure that the hub-side freewheel component is defined in the axial direction by the on the radial shoulder configured axially farther outwardly against which the appendix rests. A disadvantageous overdefinition is prevented.

In advantageous configurations, the biasing device is accommodated in the rotor-side freewheel component. The biasing device is, in particular substantially entirely and particularly preferably entirely accommodated inwardly of the rotor-side freewheel component. This offers considerable advantages as regards the axial mounting space since the rotor-side freewheel component does not, or only very little, extend in the axial direction so as to allow saving axial mounting space. This allows a further increase in the hub rigidity.

The rotor-side freewheel component in particular comprises a (cylindrical) guide section having a non-round outer contour meshing with an adapted non-round inner contour in the rotor to enable axial movability of the rotor-side freewheel component relative to the rotor and to provide the non-rotatable coupling between the rotor and the rotor-side freewheel component.

In preferred configurations, the front face end of the rotor-side freewheel component is preferably configured as a washer with the engagement elements disposed thereat.

Preferably, the rotor-side freewheel component with the guide section and the washer disposed on the front face end shows a cross-section approximately L-shaped in the radial direction. An axially aligned leg is formed by the guide section. A (partially or substantially or entirely) radially aligned leg is formed by the front-face washer.

Preferably, the biasing device urges the front-face washer with the engagement elements in the direction of the hub-side engagement element. Then, the biasing device preferably rests against the inside of the washer.

The washer and the (cylindrical) guide section preferably substantially form the rotor-side freewheel component. The guide section and the washer are particularly preferably manufactured integrally.

Particularly preferably, the biasing device is axially supported outwardly (immediately) against a rotor bearing to rotatably support the rotor. Then, the biasing device is particularly preferably directly and immediately supported on an outer bearing ring (also referred to as outer ring) of the rotor bearing.

In all the configurations, the bearings for supporting the hub shell and the rotor bearings for supporting the rotor are preferably configured as roller bearings, and in particular as deep-groove ball bearings comprising an outer bearing ring, an inner bearing ring (also referred to as inner ring) and in-between, rolling members disposed in particular in a rolling member cage.

The biasing device may be indirectly supported on a rotor bearing for example if a disk is disposed between the rotor bearing and the biasing device. Supporting the biasing device immediately on the rotor bearing allows a particularly space-saving architecture, at any rate with the biasing device configured as a cylindrical coil spring. In other configurations, it is e.g. also possible to employ a number of single springs which are supported on the outside of the rotor bearing or other components.

Preferably a sealing device is provided between the rotor and the hub shell. The sealing device in particular comprises at least one non-contact labyrinth gap diverting at least once. Furthermore, the sealing device preferably comprises at least one contacting sealing lip, in particular downstream of the labyrinth gap. The sealing device in particular prevents access of water and dust to the freewheel device as extensively as possible and in particular the most extensively possible. The sealing lip is preferably provided radially further inwardly than the labyrinth gap.

In all the configurations, it is particularly preferred for the rotor and preferably the entire hub to be provided for completely (or largely) dismantling without tools. The hub shell is preferably plugged. The limit stops are in particular plugged on, i.e. inserted or preferably pushed onto the hub axle. The hub is preferably provided for complete dismantling without tools. Optionally, dismantling the hub-side freewheel component requires a suitable tool. Alternately, the hub-side freewheel component may also be provided for dismantling without tools. In all the configurations, this facilitates assembly and dismantling and thus also maintenance or repairs.

When assembled, a clamping force of the hub is preferably supported via the inner rings of the roller bearings of the hub shell and the inner rings of the rotor bearings. In particular, at least one sleeve body each is disposed for form-fit force transmission of the clamping force, between the freewheel-side roller bearing of the hub shell and the freewheel-side rotor bearing and between the two rotor bearings. In this way, a hub is provided which transmits the clamping force form-fittingly and which is particularly stable.

Preferably, the roller bearings disposed on the opposite end regions of the hub shell rest axially inwardly with their respective inner rings against radial bulges of the hub axle. The hub axle is thus employed for form-fit force transmission of the clamping force. Particularly preferably, the hub axle is configured cylindrical and, other than the radial bulges against which the roller bearings rest to support the hub shell, it shows a substantially constant diameter and a substantially constant wall thickness wherein the diameter and the wall thickness vary by less than 25% and preferably less than 15%. The interior of the hub axle is particularly preferably cylindrical in configuration.

Particularly preferably, at least one of the roller bearings and/or the rotor bearings is configured as a deep-groove ball bearing. In particular, at least one of the roller bearings (other than the roller bearing formed in the freewheel component) is configured as a commercially available and/or standardized deep-groove ball bearing. In particular, the inner ring of the roller bearing formed in the hub-side freewheel component is provided with such dimensions as the inner rings of commercially available and/or standardized deep-groove ball bearings comprise. At least one of the roller bearings and/or the rotor bearings is preferably provided with a rolling member cage and/or bearing seals directly attached to the roller bearing and preventing entry of water and/or dust into the interior of the roller bearing.

Preferably, at least one of the roller bearings has a rolling member cage on which the rolling members are disposed.

In all the configurations it is particularly preferred for the hub to be designed for use with a through axle. Preferably, the hub comprises a through axle.

It is preferred to provide limit stops which are pushed onto the axle (also called hub axle) or which are inserted into the axle respectively hub axle. It is possible and preferred to provide exchangeable limit stops, with one set of limit stops configured to accommodate a through axle and another set of limit stops provided to accommodate for example a quick release. The latter set of limit stops shows axially outwardly cylindrical shoulders which are configured to be received in the dropouts of a frame and whose outer diameter is preferably smaller at the cylindrical base than is an inner diameter of the hub axle in a central region of the hub axle. When the hub is delivered with two sets of limit stops, the user may choose whether to use them with the through axle or with a quick release. Later retrofitting is also possible.

All the configurations may be provided with more than two roller bearings to support the hub shell. Then, at any rate (at least) one roller bearing is disposed on each of the two end regions. More than two rotor bearings may likewise be employed.

It is preferred for the rotor and in particular also the hub shell to be disposed in the same axial positions both in the freewheel position and in the engaging position. In the engaging position, a driving torque can be transmitted from the rotor to the hub shell. In the freewheel position, the rotor and the hub shell are decoupled from one another. This means that in the freewheel position, no or an insignificant rotational force is transmitted between the hub shell and the rotor.

Preferably, the hub-side freewheel component comprises an appendix protruding outwardly from the axial body section and an annular flange projecting inwardly. The engagement elements are formed on the axially outside surface (relative to the hub) of the annular flange, and a stopper is formed on the axially inside surface of the appendix which, when mounted preferably abuts against a radial shoulder of the hub shell. This achieves a sufficiently stable support in the hub shell even when the hub-side freewheel component is screwed in. This configuration reliably prevents the hub-side freewheel component from penetrating ever further into the hub shell in operation. Preferably, there is a clear distance (in the axial direction) between the axially inwardly front face of the axial body section and the hub shell while the axially inside surface of the appendix with the stopper rests against the radial shoulder in the hub shell.

In preferred embodiments, the axial body section is configured such that the axial body section with the outwardly protruding appendix and the inwardly projecting annular flange shows a (an at least substantially) T-shaped cross-section. An S- or Z-shaped cross-section is also conceivable. In the case of a T-shaped cross-section, the crossbar of the "T" and thus the annular flange and the appendix are preferably disposed axially outwardly, while the axial or tubular body sections extend further inwardly into the hub shell respectively into the hub. This configuration, and this e.g. T-shaped cross-section allow a compact structure and high stability under load. The axially outside surface (relative to the hub) of the annular flange is equipped with the engagement elements. The axially inside surface (relative to the hub) of the appendix provides a stopper which (in the assembled state) rests against the radial shoulder in the hub shell. This provides a larger volume of material in the hub shell for reliably transmitting the forces acting on the hub shell so as to provide a lightweight though stable hub.

Further advantages and features of the present invention can be taken from the exemplary embodiments which will be discussed below with reference to the enclosed figures.

BRIEF DESCRIPTION OF THE DRAWINGS

The figures show in.

DETAILED DESCRIPTION

Figure 1:
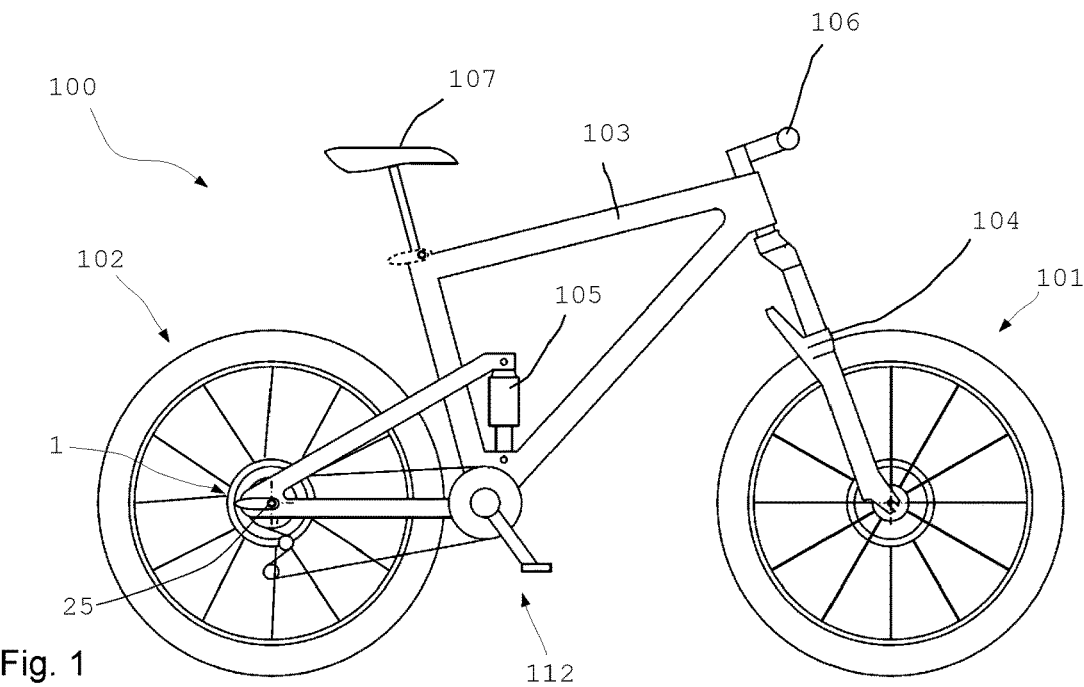
FIG. 1 a schematic illustration of a mountain bike.
Figure 2:
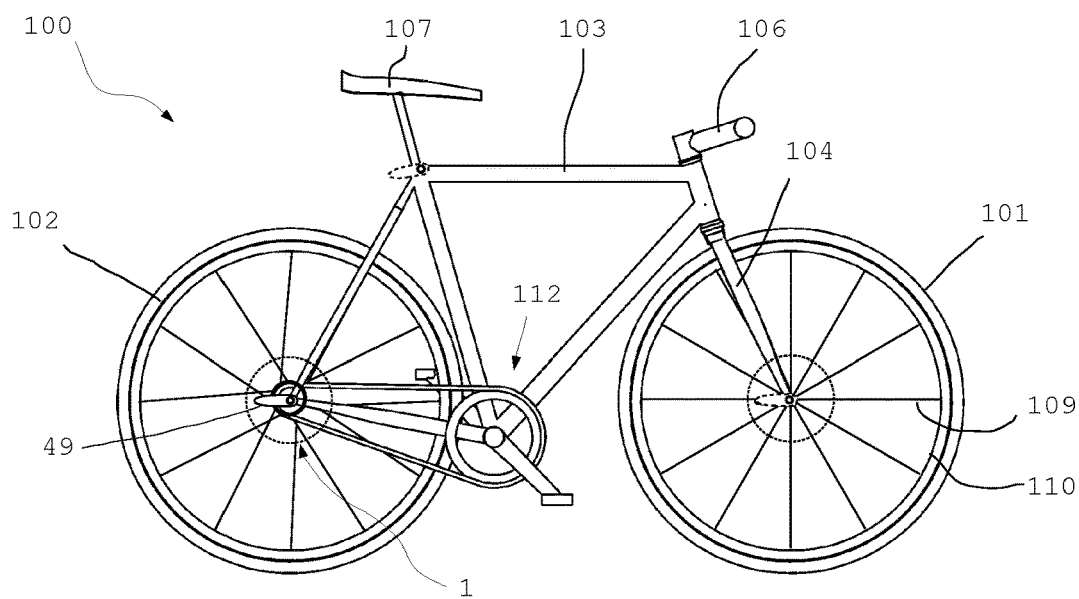
FIG. 2 a schematic illustration of a racing bicycle.

The FIGS. 1 and 2 each illustrate a mountain bike or racing bicycle 100 respectively which are equipped with a hub 1 according to the invention. The mountain bike or racing bicycle 100 is provided with a front wheel 101 and a rear wheel 102. The hub 1 according to the invention is used with the rear wheel 102. The two wheels 101, 102 are provided with spokes 109 and a rim 110. Commercial caliper brakes or other brakes such as disk brakes may be provided.

A bicycle 100 comprises a frame 103, a handlebar 106, a saddle 107, a fork or suspension fork 104 and in the case of the mountain bike, a rear wheel damper 105 may be provided. A pedal crank 112 with pedals serves for driving. Optionally, the pedal crank 112 and/or the wheels may be provided with an electrical auxiliary drive. The hubs 1 of the wheels may be attached to the frame by means of a through axle 25 or a quick release 49.

Figure 3:
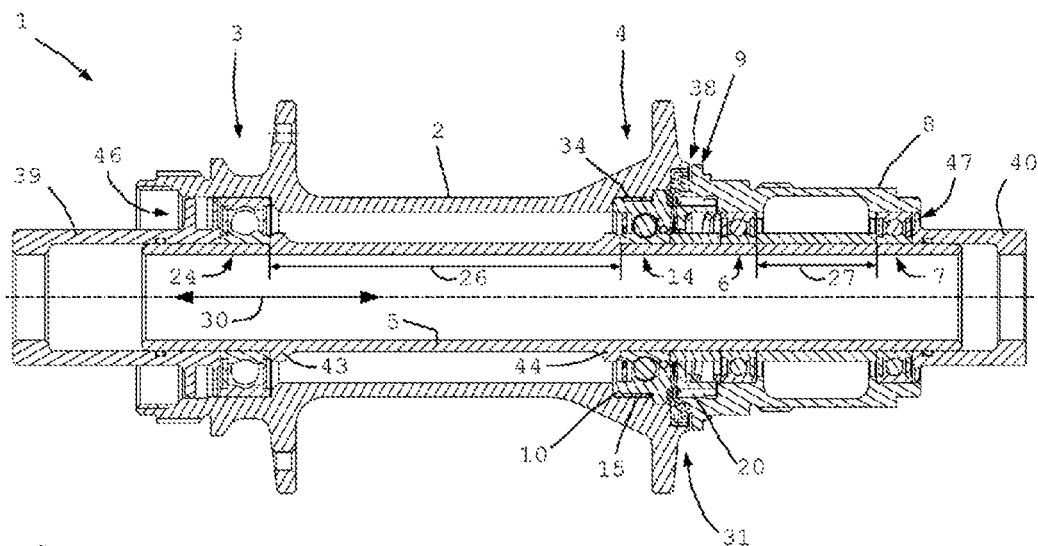
FIG. 3 a section of a hub according to the invention.

FIG. 3 shows in a section the hubs 1 inserted in the rear wheels 102 in the bicycles according to FIGS. 1 and 2.

The hub according to the invention comprises a hub shell 2 which is rotatably supported in the axial end regions 3 and 4 by means of roller bearings 24 respectively 14 to be rotatable relative to, and presently immediately on, a hub axle 5. This means that the roller bearings 14, 24 are each directly disposed on the hub axle 5.

The hub furthermore comprises a rotor 8 on which to dispose at least one sprocket. In particular, a sprocket cluster may be pushed on and attached or arranged. A freewheel device 9 is provided between the rotor 8 and the hub shell 2, comprising the hub-side freewheel component 10 and the rotor-side freewheel component 20. To prevent penetration of water and dust into the interior of the hub 1 and in particular admission of water and dust to the freewheel device 9, a sealing device 38 is configured between the rotor 8 and the hub shell 2 comprising a labyrinth-like sealing gap and a downstream lip seal contacting the rotor and reliably protecting the freewheel from entry of dirt and water.

Limit stops 39 and 40 are pushed onto the two ends of the hub axle which—while the wheel equipped therewith is not clamped in the frame—are secured on the hub axle by way of O-rings 48. The limit stops 39 and 40 are each provided with a sealing flange 46 or 47 protecting the ends of the hub 1 from entry of dirt and water. This rotor-side limit stop 40 is provided with a radial sealing flange 47, while the other limit stop 39 is provided with a double flange 46 consisting of a pair of radial sealing flanges between which an axial distance and free space is formed.

The roller bearings 14, 24 for rotatably supporting the hub shell 2 rest on radial shoulders in bulges 43, 44 of the hub axle 5. The bulges 43 and 44 are each located axially inwardly of the bearings 14, 24.

In all the configurations of the hub 1 the bulges 43, 44 preferably show a somewhat larger radial wall thickness of the hub axle 5. In particular, is the radial wall thickness in this region between about 1.5 times and 3 times the radial wall thickness in the other regions. Other than the bulges 43, 44 the hub axle 5 is substantially a hollow cylinder in configuration and shows differences in the wall thickness of preferably less than 25% and in particular less than 15% or less than 10% or less than 5% or less than 2%. Preferably, a relationship of the maximum outer diameter of the hub axle (incl. bulge) to the minimum inner diameter of the hub axle is less than 2.0 and in particular less than 1.75 and preferably less than 1.6. Preferably, the relationship of the maximum outer diameter of the hub axle to the minimum inner diameter of the hub axle is larger than 1.25 and in particular larger than 1.4.

The rotor 8 is rotatably (and immediately) supported on the axle 5 by means of a pair of rotor bearings 6 and 7.

The roller bearing 14 is disposed and formed at the hub-side freewheel component 10. This allows considerable savings in axial mounting space so that the stability and rigidity of the hub can be increased. The lateral stiffness is improved considerably. Moreover, the total weight of the hub is reduced. Both the weight of each of the freewheel components and the weight of the hub shell can be reduced since the wall thickness in the rotor-side end region 4 of the hub shell 2 can be reduced.

This freewheel component 10 on which the roller bearing 14 is configured is provided with an external thread 15 and screwed into an internal thread 34 of the hub shell 2.

Compared to the prior art, the axial distance 26 between the inner rings of the roller bearing for supporting the hub shell can be enlarged by more than 6 mm. The axial distance 27 between the rotor bearings may likewise be increased by more than 1 mm so that the stability under load of the hub 1 increases and the lateral stiffness can be considerably increased.

Figure 4:
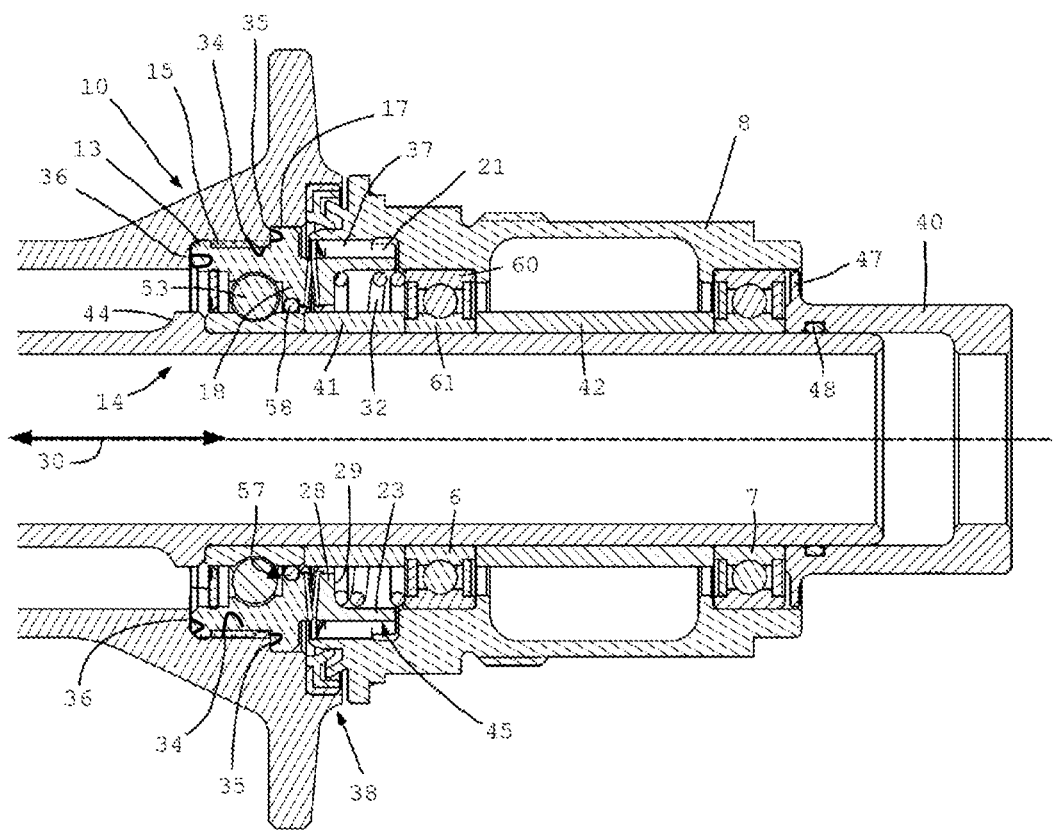
FIG. 4 an enlarged detail of the section in FIG. 3.

FIG. 4 shows an enlarged detail from FIG. 3, with the freewheel device 9 once again shown in the engaging position 31, in which the engagement elements 33, designed in particular as axial toothings (see FIG. 6), of the freewheel component 10 and the engagement element 20 are in non-rotatable engagement with one another. The engagement elements 33 are configured such (see for example FIG. 5) that given a rotational direction in the driving direction a rotational force is reliably transmitted to the hub shell 2, while given an opposite rotational direction, the freewheel component 20 is urged axially outwardly counter to the biasing force of the biasing device 32 until the engagement elements 33 disengage so as to enable a rotation of the rotor relative to the hub shell. The rotor-side freewheel component 20 is provided with a guide section 23 showing a non-round outer contour 21. The non-round outer contour 21 meshes with a matching, non-round inner contour 37 in the rotor 8 and is axially displaceable in parallel to the axial direction 30 in the rotor 8.

The freewheel component 10 comprises the roller bearing 14 which is formed thereat and comprises an inner ring 52. The outer ring 50 is formed of the material of the freewheel component 10. This outer ring 50 of the freewheel component 10 shows in radial cross-section an approximately T-shaped configuration where an axial, presently approximately tubular body section 13 has an external thread 15 on its outside while the raceway 55 for the rolling members 53 is formed on the radially inwardly peripheral surface.

The axially outwardly end of the freewheel component 10 has an appendix 17 (presently formed circumferentially) extending radially outwardly, which forms a stopper and when mounted bears against a radial shoulder 35 in the hub shell 2, and thus ensures a defined axial alignment of the freewheel component 10 and the roller bearing 14.

The axially inwardly end 13a of the freewheel component 10 shows a slight axial distance from the radial shoulder 36 in the hub shell 2 to prevent static overdefinition. The outer ring 50 of the roller bearing 14 is thus axially fixedly connected with the hub shell 2. The inner ring 52 of the roller bearing 14 is likewise received axially fixedly.

Namely, the force-fit is effected in the axial direction 30 from the limit stop 40 via the inner ring of the rotor bearing 7, the sleeve body 42, the inner ring of the rotor bearing 6, the sleeve body 41, the inner ring of the roller bearing 14, and it is then introduced via the radial bulge 44 into the hub axle from where it is transmitted via the radial bulge 43 to the inner ring of the roller bearing 24, from where the clamping force is ultimately dissipated via the limit stop 39.

The roller bearing 14 preferably has on both sides a sealing unit 57 each for sealing the roller bearing. Likewise, the other roller bearing 24 and the rotor bearings 6 and 7 are preferably each provided with such sealing units 57 for sealing on both sides.

The freewheel component 10 shows an annular flange 18 at the axially outwardly end on the front face which extends radially inwardly in particular from the axial body section 13. The engagement elements 33 are formed on the axially outside surface. Between the inner ring 52 of the roller bearing 14 and the radial inner peripheral surface of the annular flange 18 a relatively narrow radial gap remains in the radial direction, in which a seal ring 58 is preferably disposed as a sealing unit 57. The surfaces against which the seal ring 58 rests are preferably ground. It is also possible to form a sealing flange and a lip seal or two sealing flanges to prevent the admission of water, dust and dirt to the interior of the roller bearing 14.

The rotor-side freewheel component 20 comprises on its front face 22 a washer 28 on which the engagement elements 33 are configured. The washer 28 is in particular configured integrally with a cylindrical guide section 23 of the rotor-side freewheel component 20. In the interior of the engagement element 20 preferably the biasing device 32 configured in particular as a coil spring presses against the front face inner surface 9 20 so that the engagement element 20 is biased in the engaging position 31. At the other end, the coil spring 32 is preferably supported on the outer ring 60 of the rotor bearing 6. This achieves a minimum axial mounting space, whereby the rigidity and stability of the hub 1 can be markedly increased overall.

Likewise, the annular flange 18 is also integrally formed with the axial body section 13 on the hub-side freewheel component 10.

As is illustrated in FIG. 3, an axial distance 26 between the roller bearings 14 and 24 for rotatably supporting the hub shell is achieved which is clearly larger than in the prior art. This allows to markedly increase the rigidity, lateral stiffness and stability of the hub. This considerable increase of the axial distance 26 by several millimeters and even 6 mm and more allows to eliminate a double-end, floating axial support of the freewheel components 10 and 20 while still providing increased rigidity of the hub. The freewheel components 10, 20 which are in particular configured as toothed disks show even wear and a safe function is achieved. Moreover, the weight of the hub 1 can be clearly reduced.

Figure 5:
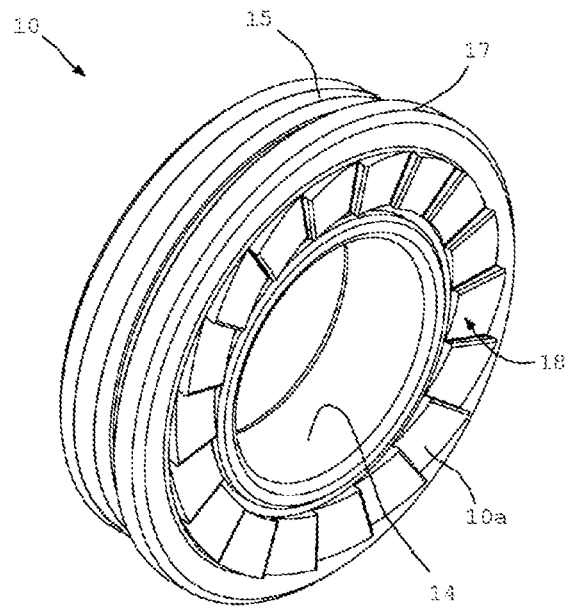
FIG. 5 a perspective illustration of the hub-side freewheel component.
Figure 6:
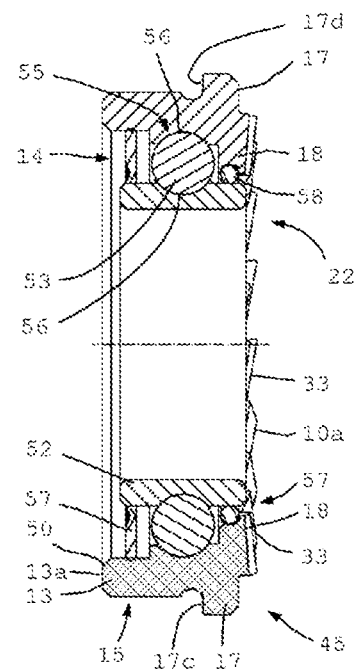
FIG. 6 a section of the hub-side freewheel component according to FIG. 5.

FIGS. 5 and 6 show the hub-side freewheel component 10 in a perspective view and in section. It is apparent that the hub-side freewheel component allows a particularly compact architecture. The annular appendix 17 allows a defined axial positioning of the hub-side freewheel component in the hub shell 2. The engagement elements 33 are formed (axially outwardly) on the annular flange 18 which extends in particular radially inwardly from the axial body section 13. Concurrently, a roller bearing is formed in the freewheel component, and provided thereon so as to achieve an extremely compact axial and radial mounting space.

FIG. 6 shows that the roller bearing is provided with an outer ring 50 which is formed respectively provided by or in the axial body section 13. A circumferential guide roll 56 is formed on the radially inwardly circumferential surface of the axial body section 13 (outer ring 50) to guide the rolling members 53. Thereby a deep-groove ball bearing is provided which can also transmit axial forces other than radial forces. A matching guide groove 56 is formed in the inner ring 52. Sealing units 57 are provided on both axial sides to seal the roller bearing 14 wherein the axially outwardly sealing unit 57 is formed as a seal ring 58 that is circular or oval in cross-section.

Figure 7:
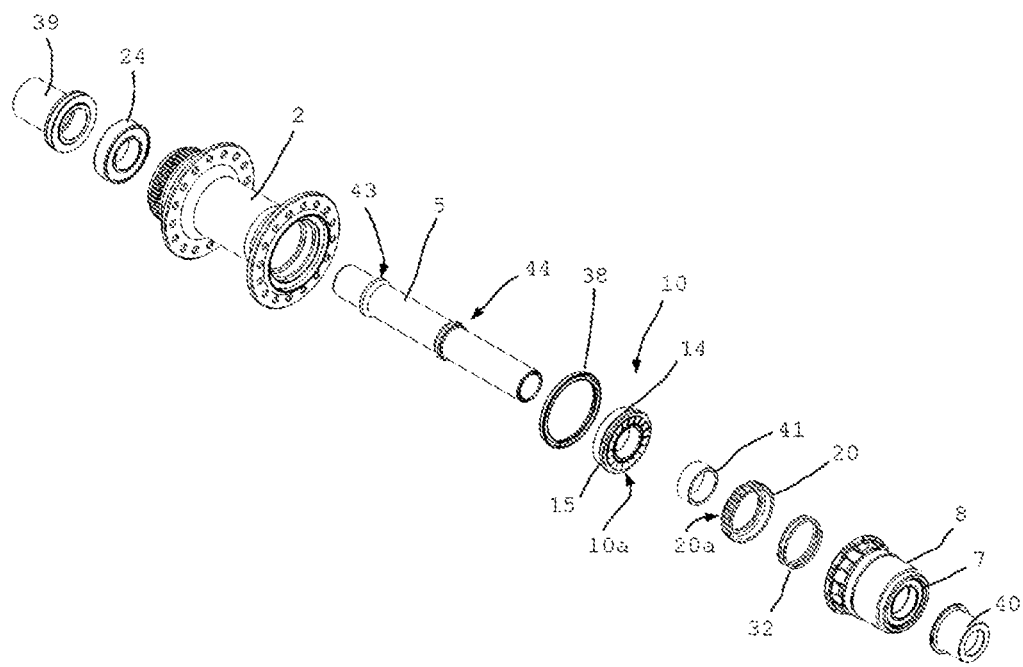
FIG. 7 an exploded view of the hub according to FIG. 3.

FIG. 7 shows an illustration of essential parts of the hub 1 according to the invention in an exploded view. On the left, the limit stop 39 is shown which after installation or insertion of the roller bearing 24 into the hub sleeve 2 can be pushed onto the hub axle 5. The hub axle 5 shows radial bulges 43 and 44. At the opposite end 4 of the hub shell 2 the freewheel component 10 with the external thread 15 is screwed into an internal thread 34 of the hub shell 2. The roller bearing 14 is formed on the freewheel component 10 to rotatably support the hub shell 2 relative to the hub axle 5. The sealing device 38 seals the region between the hub shell 2 and the rotor 8. Thereafter, the sleeve body 41 is pushed onto the hub axle 5.

The rotor bearings 6 and 7 with the sleeve body 42 in-between are inserted into the rotor 8. Furthermore, the biasing device 32 and the rotor-side freewheel component 20 are inserted into the rotor and the rotor 8 is pushed onto the hub axle 5. Finally, the limit stop 40 is pushed on. Thus the hub is assembled.

Dismantling and maintenance of the hub 1 is accordingly simple and may be performed manually anytime to clean the hub after use for example in off-road terrain or following an extended road ride. This ensures an always reliable function.

Figure 8:
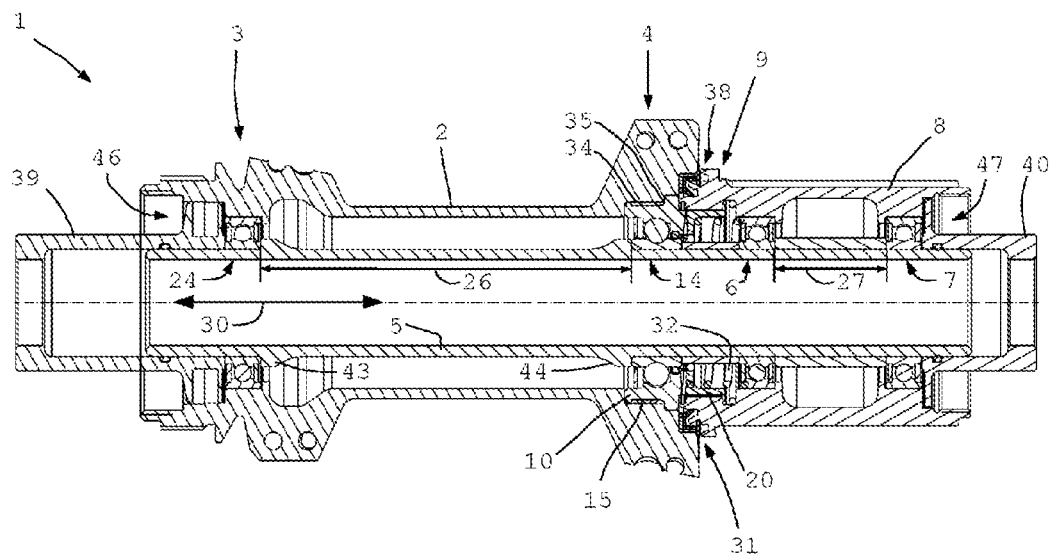
FIG. 8 a section of another hub according to the invention.
Figure 9:
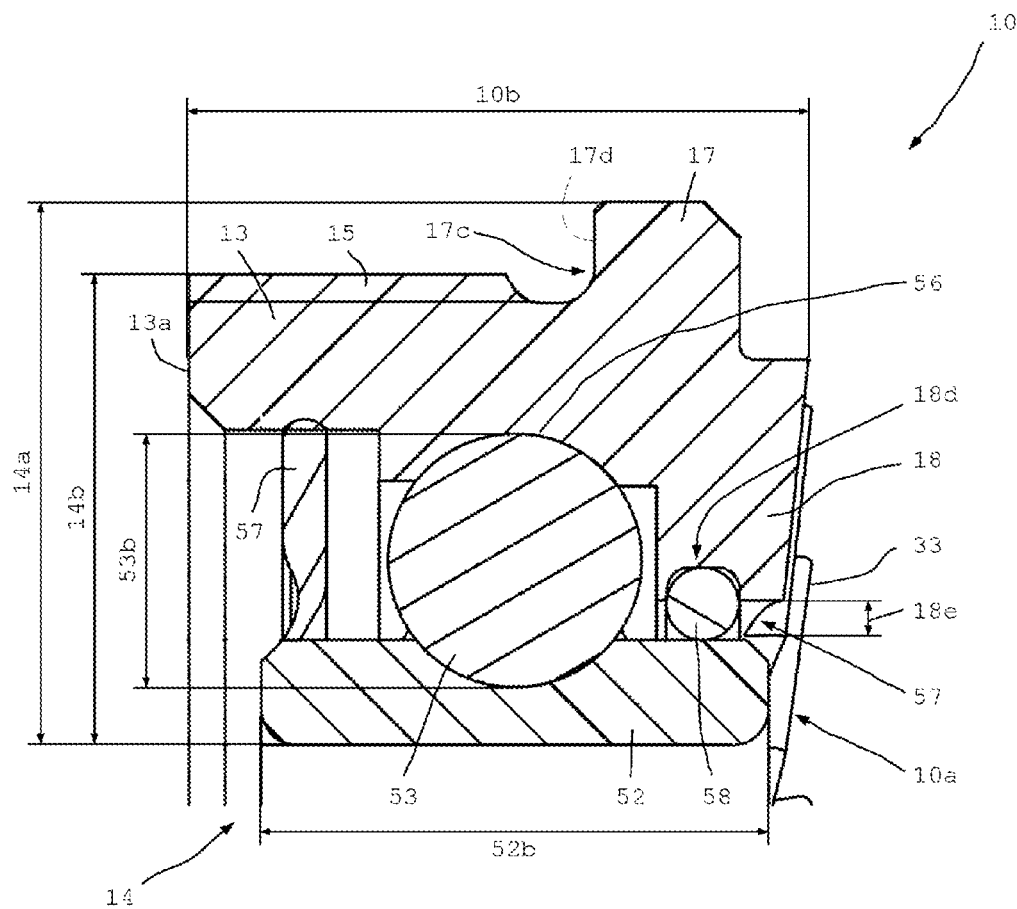
FIG. 9 an enlarged detail of the section in FIG. 8.

The FIGS. 8 and 9 illustrate a slightly modified exemplary embodiment. The reference numerals are identical so that the description of the previous exemplary embodiment may be referred to identically, apart from a few deviating parts, and it serves again to describe this exemplary embodiment. Substantial differences and the substantial parts deviating from the preceding exemplary embodiment will be discussed below.

FIG. 8 shows a section of the complete hub 1, and FIG. 9, which is an enlarged detail, a sectional fragment of the hub-side freewheel component 10 in FIG. 8.

Unlike in the previous exemplary embodiment, this hub 1 is not provided with radially circumferential spoke flanges but the hub 1 is equipped with accommodations for mounting so-called "straight pull" spokes. Then, the hub shell may be configured accordingly to accommodate e.g. straight, non-cranked spokes ("straight pull spokes"). However, the hub 1 according to FIG. 8 may be equipped as is the hub 1 according to FIG. 3, with conventional and circumferential spoke flanges or the like.

The hub 1 according to FIG. 8 is provided with a hub-side freewheel component 10, part of which is shown in FIG. 9 in section. The freewheel component 10 is highly compact and on the whole has approximately the dimensions of a conventional roller bearing. However, the freewheel component 10 performs the additional function of axially attaching the "freewheel bearing" through the thread 15 on the axial body section 13 where the outer ring 50 is also formed. Furthermore, two sealing units 57 are integrated in the freewheel component 10 of which the sealing unit formed as a seal ring 58 seals an extremely narrow gap 18e. A circumferential sealing groove 18d is configured in the radially inwardly projecting annular flange 18 whose depth approximately corresponds to the size of the gap 18e (+/−

10%). The seal ring 58 enables efficient sealing of the interior of the hub bearing 14 integrated in the freewheel component 10.

The gap 18e shows a size which as a rule is between 1/10 and 1/4 and presently approximately 1/7 of the diameter of the rolling members 53. The gap 18e is less than 1/4 and presently in particular less than 1/10 of the axial width of the inner ring 52.

The axial body section 13 is integrally connected with the annular flange 18 on whose front face an axial toothing 10a with engagement elements is configured. The axial toothing 10a interacts with an axial toothing 20a on the rotor-side freewheel component 20.

A ratio of the maximum axial width 10b of the hub-side freewheel component 10 with an integrated hub bearing 14 to a radial extension 14a of the hub-side freewheel component 10 from the inner ring 52 up to the radially extreme point of the hub-side freewheel component 10 lies between 0.8 and 1.5, and in particular between 1 and 1.3.

A ratio of an axial width 10b of the hub-side freewheel component 10 to an axial width 52b of the inner ring 52 of the hub bearing 14 integrated in the hub-side freewheel component 10 is presently between 1 and 1.5, and in particular between 1.1 and 1.3.

A ratio of an axial width 10b of the hub-side freewheel component 10 to a diameter 53b of a rolling member 53 of the hub bearing 14 integrated in the hub-side freewheel component 10 is between 2:1 and 3:1, and in particular between 2.25 and 2.75, and it may preferably be 2.45.

A ratio of a radial dimension 14b of the hub-side freewheel component from the inner ring 52 up to the outer surface of the axial body section 13 to a diameter 53b of a rolling member 53 is between 2.5 and 1.5, and presently between 1.7 and 2.

FIG. 9 shows the stopper 17d formed on the axially inside surface 17c of the appendix 17. In the mounted state, the stopper 17d rests against the radial bearing shoulder 36 in the hub shell. The stopper 17d together with the radial shoulder 36 prevents the hub-side freewheel component from screwing ever further into the hub shell 2. Absent such boundary, any rotational force acting on the axial toothing will over time result in ever increasing screwing in. Thus, absent the stopper 17d, the hub shell may be dilated and even burst since the freewheel is configured for transmitting rotational forces of up to 400 Nm or more.

Another contribution is due to a clear distance which is configured (in the axial direction) between the axially inwardly front face of the axial body section and the hub shell and is presently between approximately 0.05 mm and 0.35 mm. This is for ensuring that the axial body section 13 screws into the hub shell up to the stopper 17d where it is supported on the hub shell.

The hub enables increased lateral stiffness, increased bending stiffness, and a still safe operation. At the same time, the weight may be reduced which is of particular importance in the area of sports and for professional use.

Another advantage is the smaller cross-section of the hub shell which is thus aerodynamically better. The quantity of parts is smaller so as to make servicing, assembly and disassembly easier. Manufacturing the hub is also easier.

In all the configurations, it is preferred to employ ground inner bearing rings in the roller bearings. A ground outer ring may also be employed so as to obtain very low frictional values.

While a particular embodiment of the hub, in particular for bicycles, has been described herein, it will be appreciated by those skilled in the art that changes and modifications may be made thereto without departing from the invention in its broader aspects and as set forth in the following claims.

LIST OF REFERENCE NUMERALS

| | |
|---|---|
| 1 | hub |
| 2 | hub shell |
| 3 | end region |
| 4 | end region |
| 5 | hub axle |
| 6 | rotor bearing |
| 7 | rotor bearing |
| 8 | rotor |
| 9 | freewheel device |
| 10 | hub-side freewheel component |
| 10a | axial toothing |
| 10b | axial width of 10 |
| 13 | axial body section |
| 13a | axially inwardly front face |
| 14 | hub bearing, roller bearing |
| 14a | radial extension |
| 14b | radial dimension |
| 15 | external thread |
| 17 | appendix |
| 17c | axially inside surface |
| 17d | stopper |
| 18 | annular flange |
| 18d | sealing groove |
| 18e | gap |
| 20 | rotor-side freewheel component |
| 20a | axial toothing |
| 21 | outer contour |
| 22 | front face of 10, 20 |
| 23 | cylindrical guide section |
| 24 | roller bearing |
| 25 | through axle |
| 26 | bearing distance 14, 24 |
| 27 | bearing distance 6, 7 |
| 28 | washer |
| 29 | inner surface of 28 |
| 30 | axial direction |
| 31 | engaging position |
| 32 | biasing device |
| 33 | engagement elements |
| 34 | internal thread of 2 |
| 35 | radial shoulder in 2 |
| 36 | radial shoulder in 2 |
| 37 | inner contour in 8 |
| 38 | sealing device |
| 39 | limit stop |
| 40 | limit stop |
| 41 | sleeve any |
| 42 | sleeve body |
| 43 | radial bulges |
| 44 | radial bulges |
| 45 | T-shape |
| 46 | double flange of 39 |
| 47 | sealing flange of 40 |
| 48 | O-ring |
| 49 | quick release |
| 50 | outer ring of 14 |
| 51 | outer ring of 24 |
| 52 | inner ring |
| 52b | axial width of 52 |
| 53 | roiling member |
| 53b | diameter |
| 55 | raceway at 50 |
| 56 | guide groove |
| 57 | sealing unit |
| 58 | sealing unit, seal ring |
| 60 | outer ring of 6, 7 |
| 61 | inner ring of 6, 7 |
| 100 | bicycle |
| 101 | wheel, front wheel |
| 102 | wheel, rear wheel |
| 103 | frame |
| 104 | fork, suspension fork |
| 105 | rear wheel damper |
| 106 | handlebar |

| | |
|---|---|
| 107 | saddle |
| 109 | spoke |
| 110 | rim |
| 112 | pedal crank |

The invention claimed is:

1. A hub for at least partially muscle-powered vehicles, the hub comprising:
a hub shell rotatably supported relative to a hub axle and a rotor rotatably supported relative to the hub axle by means of at least two rotor bearings; and
a freewheel device having a pair of interacting freewheel components namely, a hub-side freewheel component and a rotor-side freewheel component;
wherein the two freewheel components are movable relative to one another in the axial direction at least between a freewheel position and an intermeshing engaging position in which a driving torque can be transmitted;
the hub-side freewheel component is compact in configuration and a hub bearing to rotatably support the hub shell is integrated and configured therein;
wherein an outer ring of the hub bearing defines an axial body section of the hub-side freewheel component, and wherein at least one sealing unit protects the interior of the hub bearing from the entry of foreign bodies,
wherein the rotor-side freewheel component comprises a guide section having a non-round outer contour meshing with an adapted non-round inner contour in the rotor to enable axial movability of the rotor-side freewheel component relative to the rotor, and to provide a non-rotatable coupling between the rotor and the rotor-side freewheel component, and
wherein a front-face end of the rotor-side freewheel component is configured as a washer with engagement elements disposed thereat, and
wherein a biasing device is accommodated in the rotor-side freewheel component and urges the front-face washer with the engagement elements in the direction of the hub-side freewheel component.

2. The hub according to claim 1, wherein the axial body section is connected with an annular flange where an axial toothing is configured which interacts with an axial toothing on the rotor-side freewheel component.

3. The hub according to claim 2, wherein the at least one sealing unit is disposed between an inner ring of the hub bearing and the annular flange.

4. The hub according to claim 3, wherein the sealing unit comprises at least one seal ring disposed in a sealing groove between the annular flange and the inner ring.

5. The hub according to claim 1, wherein a ratio of the maximum axial width of the hub-side freewheel component with the hub bearing to a radial extension of the hub-side freewheel component from an inner ring up to the radially extreme point is between 0.8 and 1.5 or between 1 and 1.4.

6. The hub according to claim 1, wherein a ratio of an axial width of the hub-side freewheel component to an axial width of an inner ring of the hub bearing integrated in the hub-side freewheel component is between 1 and 1.5.

7. The hub according to claim 1, wherein a ratio of an axial width of the hub-side freewheel component to a diameter of a rolling member of the hub bearing integrated in the hub-side freewheel component is between 2:1 and 3:1.

8. The hub according to claim 1, wherein a ratio of a radial dimension of the hub-side freewheel component from an inner ring up to an outer surface of the axial body section to a diameter of a rolling member is between 2.5 and 1.5.

9. The hub according to claim 1, wherein the two freewheel components are biased in the engaging position by means of the biasing device, each of the two freewheel components comprising engagement elements formed on a front face which intermesh in the engaging position.

10. The hub according to claim 1, wherein the hub bearing comprises rolling members disposed between the outer ring and an inner ring and wherein a guide for the rolling members is configured at least in the outer ring.

11. The hub according to claim 1, wherein the rotor-side freewheel component is non-rotatably coupled with the rotor and the hub-side freewheel component is non-rotatably and axially fixedly coupled with the hub shell.

12. The hub according to claim 1, wherein the axial body section is configured tubular.

13. The hub according to claim 12, wherein the axial body section comprises a round outer cross-section having an external thread which in the mounted state is screwed into an internal thread of the hub shell.

14. The hub according to claim 1, wherein the hub-side freewheel component comprises a radially outwardly protruding appendix which when mounted rests against a radial shoulder of the hub body.

15. The hub according to claim 1, wherein the sealing unit comprises at least one radial flange or double flange.

16. The hub according to claim 1, wherein the biasing device is accommodated in the rotor-side freewheel component.

17. The hub according to claim 1, wherein the front face end of the rotor-side freewheel component is configured as a washer on which the engagement elements are formed.

18. The hub according to claim 17, wherein the biasing device is received in the rotor-side freewheel component and urges the front-face washer with the engagement elements in the direction of the hub-side freewheel component.

19. The hub according to claim 1, wherein the biasing device is axially outwardly supported on one of the at least two rotor bearings to rotatably support the rotor.

20. The hub according to claim 1, wherein the biasing device is configured as a cylindrical coil spring.

21. The hub according to claim 1, wherein a sealing device having a non-contact labyrinth gap and a contacting sealing lip is disposed between the rotor and the hub shell and wherein the sealing device prevents admission of water and dust to the freewheel device.

22. The hub according to claim 1, wherein the rotor can be dismantled without tools, the hub shell is plugged, limit stops are plugged on, and the hub, apart from the hub-side freewheel component, is provided for no-tools dismantling.

23. The hub according to claim 1, wherein in a mounted state, a clamping force of the hub is supported via inner rings of roller bearings of the hub shell and inner rings of the at least two rotor bearings.

24. The hub according to claim 1, wherein at least one sleeve body each is disposed for form-fit force transmission of a clamping force, between a freewheel-side hub bearing of the hub shell and a freewheel-side rotor bearing, and between the at least two rotor bearings.

25. The hub according to claim 1, wherein the hub bearings are disposed on opposite end regions of the hub shell, each of the hub bearings resting with inner rings axially inwardly against radial bulges of the hub axle.

26. The hub according to claim 1, wherein at least one of the hub bearings and rotor bearings is configured as a deep-groove ball bearing and comprises a rolling member cage and is provided with the at least one sealing unit.

27. The hub according to claim 1, comprising a through axle.

\* \* \* \* \*